(12) United States Patent
Cowe et al.

(10) Patent No.: US 10,713,329 B2
(45) Date of Patent: Jul. 14, 2020

(54) DERIVING LINKS TO ONLINE RESOURCES BASED ON IMPLICIT REFERENCES

(71) Applicant: LONGSAND LIMITED, Cambridge (GB)

(72) Inventors: Brian Cowe, Cambridge (GB); Sean Blanchflower, Cambridge (GB)

(73) Assignee: LONGSAND LIMITED, Cambridge (GB)

(*) Notice: Subject to any disclaimer, the term of this patent is extended or adjusted under 35 U.S.C. 154(b) by 0 days.

(21) Appl. No.: 16/174,932

(22) Filed: Oct. 30, 2018

(65) Prior Publication Data

US 2020/0134097 A1    Apr. 30, 2020

(51) Int. Cl.
| G06F 16/955 | (2019.01) |
| G06F 16/958 | (2019.01) |
| G06F 16/9535 | (2019.01) |
| G06F 40/247 | (2020.01) |
| G06F 40/289 | (2020.01) |

(52) U.S. Cl.
CPC ...... G06F 16/9558 (2019.01); G06F 16/9535 (2019.01); G06F 16/986 (2019.01); G06F 40/247 (2020.01); G06F 40/289 (2020.01)

(58) Field of Classification Search
CPC .............. G06F 16/9558; G06F 16/986; G06F 16/9535; G06F 17/2775; G06F 17/2795
USPC ........................ 715/205, 206, 234
See application file for complete search history.

(56) References Cited

U.S. PATENT DOCUMENTS

| 6,219,664 | B1* | 4/2001 | Watanabe | G06F 16/3344 |
| 6,311,152 | B1* | 10/2001 | Bai | G06F 17/277 |
| | | | | 704/251 |
| 6,862,710 | B1* | 3/2005 | Marchisio | G06F 16/954 |
| | | | | 715/206 |
| 7,398,201 | B2* | 7/2008 | Marchisio | G06F 17/271 |
| | | | | 704/9 |
| 7,788,084 | B2* | 8/2010 | Brun | G06F 17/271 |
| | | | | 704/7 |
| 8,594,996 | B2* | 11/2013 | Liang | G06F 17/21 |
| | | | | 704/9 |
| 8,645,417 | B2* | 2/2014 | Groeneveld | G06F 16/951 |
| | | | | 707/776 |
| 8,700,604 | B2* | 4/2014 | Roseman | G06F 17/278 |
| | | | | 707/716 |

(Continued)

FOREIGN PATENT DOCUMENTS

| CN | 101582075 B | 5/2011 |
| CN | 102253972 B | 6/2011 |

(Continued)

OTHER PUBLICATIONS

"Will Smith;" Mar. 20, 2017, willsmith.com; 2 Pages.*

(Continued)

*Primary Examiner* — Andrew R Dyer

(57) ABSTRACT

In some examples, a system performs language processing of text of an information page to determine whether the text refers to an online resource, and in response to determining that the text refers to the online resource, identify the text as an implicit reference to the online resource. The system derives a link to the online resource based on the implicit reference, the derived link useable in accessing the online resource.

18 Claims, 4 Drawing Sheets

(56) References Cited

U.S. PATENT DOCUMENTS

| | | | | |
|---|---|---|---|---|
| 8,954,469 | B2* | 2/2015 | Dhillon | G06F 16/951 |
| | | | | 707/779 |
| 9,378,285 | B2* | 6/2016 | Marchisio | G06F 16/951 |
| 9,471,670 | B2 | 10/2016 | Roseman et al. | |
| 9,613,004 | B2* | 4/2017 | Liang | G06F 17/21 |
| 9,710,556 | B2* | 7/2017 | Koperski | G06F 16/951 |
| 9,781,091 | B2* | 10/2017 | Shyamsunder | G06F 16/245 |
| 9,965,508 | B1* | 5/2018 | Cooke | G06F 17/2785 |
| 10,057,207 | B2* | 8/2018 | Kaliski, Jr. | G06F 16/9566 |
| 10,185,741 | B2* | 1/2019 | Shyamsunder | G06F 16/245 |
| 10,235,461 | B2* | 3/2019 | Elkherj | G06F 16/951 |
| 10,311,074 | B1* | 6/2019 | Beard | G06F 16/25 |
| 10,459,994 | B2* | 10/2019 | Maldonado Cabrera | |
| | | | | G06F 16/9535 |
| 2002/0169854 | A1* | 11/2002 | Tarnoff | G06F 21/6218 |
| | | | | 709/219 |
| 2004/0064447 | A1* | 4/2004 | Simske | G06F 16/3338 |
| 2004/0167911 | A1* | 8/2004 | Wakefield | G06F 16/258 |
| 2005/0108262 | A1* | 5/2005 | Fawcett, Jr. | G06Q 10/063 |
| 2005/0267871 | A1* | 12/2005 | Marchisio | G06F 16/3338 |
| 2006/0224565 | A1* | 10/2006 | Ashutosh | G06F 16/35 |
| 2007/0067285 | A1* | 3/2007 | Blume | G06F 17/278 |
| 2007/0156669 | A1* | 7/2007 | Marchisio | G06F 16/951 |
| 2007/0233656 | A1* | 10/2007 | Bunescu | G06F 17/278 |
| 2008/0228720 | A1* | 9/2008 | Mukherjee | G06F 16/3338 |
| 2008/0303689 | A1* | 12/2008 | Iverson | H04L 63/1441 |
| | | | | 340/6.1 |
| 2009/0144609 | A1* | 6/2009 | Liang | G06F 17/21 |
| | | | | 715/230 |
| 2010/0145940 | A1* | 6/2010 | Chen | G06F 16/35 |
| | | | | 707/736 |
| 2012/0233195 | A1* | 9/2012 | Dettinger | G06F 16/951 |
| | | | | 707/759 |
| 2014/0156702 | A1* | 6/2014 | Shyamsunder | G06F 16/245 |
| | | | | 707/769 |

FOREIGN PATENT DOCUMENTS

| | | |
|---|---|---|
| EP | 3267332 A4 | 1/2018 |
| WO | WO-2018077978 A1 | 5/2018 |

OTHER PUBLICATIONS

Mehta et al., Analysis of DOM based Automatic Web Content Extraction, http://www.conference.bonfring.org/papers/met_ncnhit2013/ncnhit28.pdf, 2013 (4 pages).

Robie, Jonathan, What is the Document Object Model? 2000 (9 pages).

shodhganga.inflibnet.ac.in, Information Retrieval on the Web, http://shodhgangainflibnet.ac.in/bitstream/10603/149326/11/11_chapter%203.pdf dated before the filing date of the present application (33 pages).

* cited by examiner

DERIVING LINKS TO ONLINE RESOURCES BASED ON IMPLICIT REFERENCES

BACKGROUND

A web page includes a document that contains content displayable by a web browser. The web page can include hyperlinks to other web resources, such as other web pages, scripts, web services, or any other content that is accessible over a network.

BRIEF DESCRIPTION OF THE DRAWINGS

Some implementations of the present disclosure are described with respect to the following figures.

Figure 1:
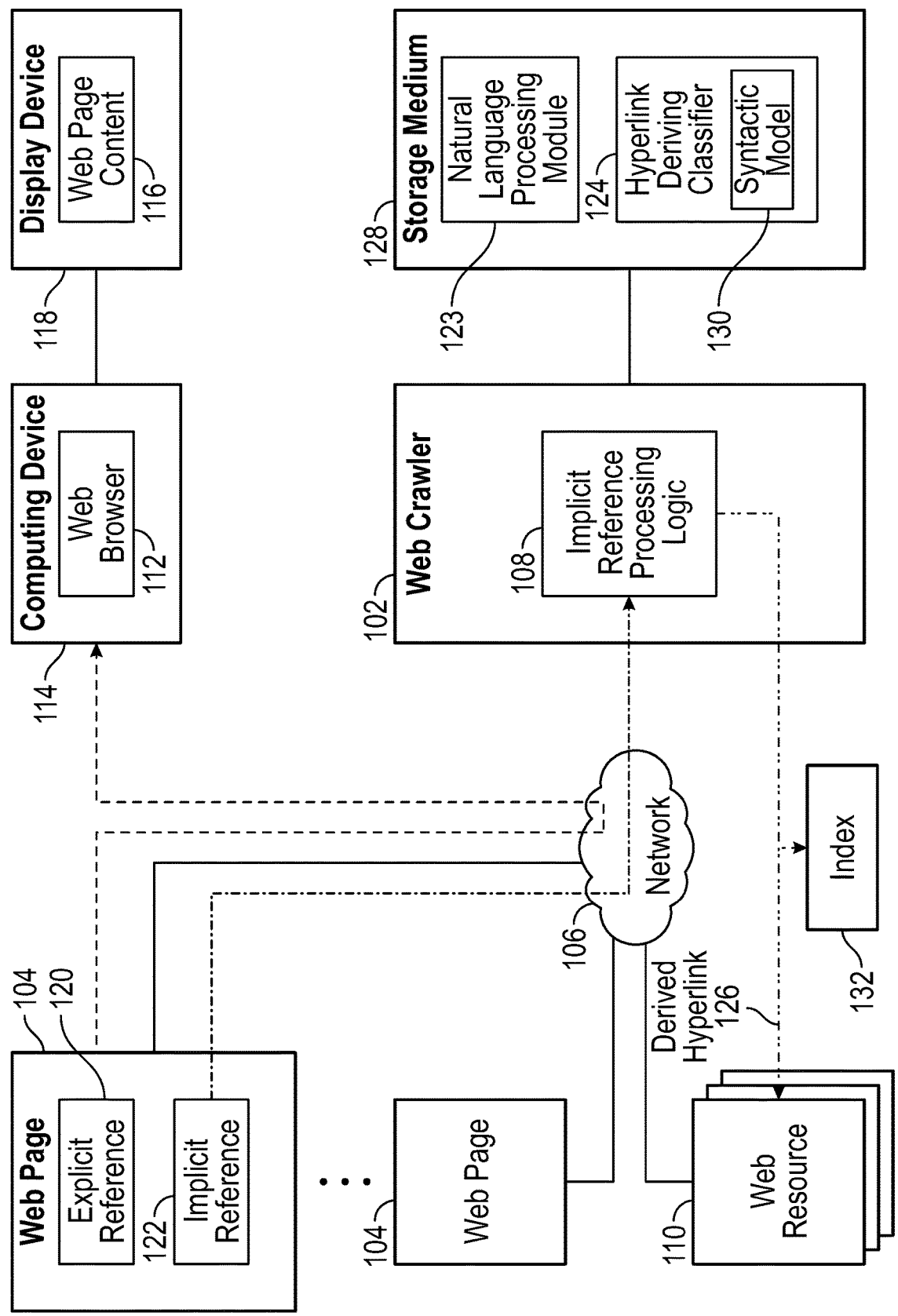
FIG. 1 is a block diagram of an arrangement according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A web crawler is an example of a tool that analyzes content of web pages and follows hyperlinks in the web pages to other web resources. The other web resources in turn can contain hyperlinks that the web crawler can further follow to identify even further web resources. As used here, a "web resource" can refer to a web page, an executable script, a web service, or any other content that is accessible over a network.

The information obtained by the web crawler can be used to build up an index or other repository of information relating to the web resources identified by the web crawler. In examples where the index is constructed based on the output of the web crawler, the index can be used by a search engine to more quickly and efficiently find web resources in response to a search query, such as one submitted by a user, machine, or program. In other examples, the repository of information relating to the web resources identified by the web crawler can be used for other purposes, such as to develop an inventory of the web resources available in a given domain or enterprise, and so forth.

A hyperlink in a web page can refer to a string of characters (e.g., a string of numbers, alphabets, and/or symbols) that is in a form recognizable as an explicit reference to another web resource. In some examples, the hyperlink can be directly used to traverse to the other web resource. In other examples, the hyperlink can be appended to another string to traverse to the other web resource. A hyperlink can include location information (such as in the form of a Uniform Resource Locator or URL) that identifies a location of a web resource in a network.

In other cases, references to web resources may not be in the form of hyperlinks in web pages. Instead, a web page can refer to a web resource textually, using text in the web page. For example, the textual reference can refer to an academic or publication source, such as in the form of "Journal of Machines, Volume X, No. Y, pp. 100-120, October 2018." In another example, the textual reference can describe a web page, such as in the form of "the Wikipedia article on Computer Science." As another example, the textual reference can refer to an online news article, such as in the form of "a New York Times story about the response to the royal wedding."

These textual references are referred to as implicit references, since they implicitly refer to web resources without using hyperlinks. An implicit reference does not include sufficient information to directly traverse to the web resource associated with implicit reference.

Having humans analyze web pages to find implicit references and derive hyperlinks to corresponding web resources can be time consuming and costly. In some cases, human analysts may miss implicit references in web pages.

In other cases, a web crawler or other tool may simply ignore implicit references in web pages, which may lead to imprecise results relating to the identification of web resources that are referenced in the web pages.

In accordance with some implementations of the present disclosure, automated mechanisms or techniques are used to identify implicit references in web pages and to derive links to web resources based on the identification of the implicit references. In some examples, a system performs language processing of text of a web page to determine whether the text refers to a web resource, and in response to determining that the text refers to the web resource, identifies the text as an implicit reference to the web resource. The system derives a link to the web resource based on the implicit reference, where the derived link is useable to access the web resource.

Although some examples described refer to web pages and web resources, it is noted that techniques according to some implementations can also be applied to other information pages and online resources. An information page can refer to any document, file, data record, etc., that includes information content. An information page can refer to any of the following: a web page, a Sharepoint document, a file of a filesystem, and so forth. An online resource can refer to any resource (e.g., a web page, an executable script, a web service, a document, a file, etc.) that is accessible over a network.

More generally, according to some implementations, automated mechanisms or techniques are used to identify implicit references in information pages and to derive links to online resources based on the identification of the implicit references. In some examples, a system performs language processing of text of an information page to determine whether the text refers to an online resource, and in response to determining that the text refers to the online resource, identifies the text as an implicit reference to the online resource. The system derives a link to the online resource based on the implicit reference, where the derived link is useable to access the online resource.

FIG. 1 is a block diagram of an example arrangement that includes a web crawler 102 that is able to crawl web pages 104 available over a network 106, which can include the Internet, a local network, and so forth. The network 106 can include a wired network and/or a wireless network. More generally, a crawler can crawl information pages available over the network 106.

The web crawler 102 can be implemented as a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, the web crawler 102 can be implemented as a combination of a hardware processing circuit and machine-readable instructions (software and/or firmware) executable on the hardware processing circuit. In some examples, the web crawler 102 can be in the form of machine-readable instructions executable on a computing node or multiple computing nodes.

The web crawler 102 includes an implicit reference processing logic 108, which is able to identify implicit references in the web pages 104 (or more generally, information pages) to derive hyperlinks to web resources 110 (or more generally, online resources) that are accessible over the network 106. The web pages 104 can be provided by web servers coupled to the network 106. Web pages can also be provided by other resources coupled to the network 106.

A web page 104 or other web resource can be retrieved by a web browser 112 executing in a computing device 114, such as a notebook computer, a desktop computer, a tablet computer, a smartphone, or any other electronic device. The web browser 112 can present the content of the web page ("web page content" 116) or other web resource in a display device 118 coupled to the computing device 114. The display device 118 can be part of the computing device 114 or can be external of the computing device 114.

In the example of FIG. 1, a web page 104 can include an explicit reference 120 to a web resource, where the explicit reference 120 can be in the form of a hyperlink. The web page 104 can also include an implicit reference 122, which includes text that can refer to a web resource but is not in the form of a hyperlink to the web resource that can be used to access the web resource.

In accordance with some implications of the present disclosure, the implicit reference processing logic 108 can identify the implicit reference 122 in a web page 104. In some examples, the identification of the implicit reference 122 in the web page 104 is based on performing natural language processing of text in the web page 104 to determine whether the text refers to a web resource. Natural language processing refers to processing natural text that can be found in the content of a web page.

In some examples, the implicit reference processing logic 108 can invoke a natural language processing module 123 (implemented as machine-readable instructions, for example) that can be stored on a storage medium 128. The storage medium 128 can be implemented using a memory device (or multiple memory devices) and/or a storage device (or multiple storage devices). The storage medium 128 is accessible by the web crawler 102.

The natural language processing performed by the natural language processing module 123 can be based on a set of rules that relate to the grammar and syntax of words that can appear in the web page content. The set of rules used in the natural language processing can also include a rule (or multiple rules) that specify what words or phrases in the text are likely to refer to a web resource (i.e., the words or phrases describe the web resource or otherwise mentions a concept, topic, or thing that is associated with the web resource). For example, the rule(s) can include a list of words or phrases that have previously been identified as referring to web resources. For example, the list of words or phrases can include words/phrases such as "Journal of Machines," "Wikipedia," "New York Times," etc., that refer to respective web resources, such as a website that includes archived articles from the Journal of Machines, the Wikipedia website, and the New York Times website that includes newspaper articles.

In other examples, other natural language processing techniques can be employed by the natural language processing module 123 to process a web page to identify text that refer to web resources and thus are to be identified as implicit references.

Once the implicit reference 122 is identified, the implicit reference processing logic 108 can use a hyperlink deriving classifier 124 to derive a hyperlink (referred to as a "derived hyperlink" 126). The hyperlink deriving classifier 124 can be trained and stored in the storage medium 128.

The hyperlink deriving classifier 124 can use a syntactic model 130 that defines patterns of text that indicate presence of entities that are part of links to web resources.

The syntactic model 130 can be generated by human expert(s), or alternatively, the syntactic model 130 can be learned over time based on operation of the hyperlink deriving classifier 124. The hyperlink deriving classifier 124 analyzes the text of the implicit reference, and based on the syntactic model 130, the hyperlink deriving classifier 124 is able to derive an entity that represents a web resource based on the text of the implicit reference 122. An "entity" representing a web resource can refer to a word or combination of words that is part of the hyperlink that links to the web resource. Example entities that can be derived from text of an implicit reference (e.g., "Wikipedia definition of computer science") include "en.wikepedia.org" and "title=computer science." The text "Wikipedia definition of computer science" of the implicit reference has words and phrases that can be used to derive, based on the syntactic model 130, the entities "en.wikepedia.org" and "title=computer science" that are to be part of a hyperlink. For example, a hyperlink derived from the above example implicit reference can include site=en.wikepedia.org/title='computer science,' or https://en.wikipedia.org/wiki/computer_science.

The derived hyperlink 126 can include a structured hyperlink or a semi-structured hyperlink. A structured hyperlink refers to a hyperlink that can be used to directly access a corresponding web resource. A semi-structured hyperlink can refer to a hyperlink that is to be appended to further information to form a hyperlink that can be used to access the corresponding web resource.

The derived hyperlink 126 can be used by the web crawler 102 to access a web resource 110 referred to by the derived hyperlink 126. The web resource 110 referred to by the derived hyperlink 126 may in turn contain additional content to be crawled by the web crawler 102 to potentially identify further explicit and implicit references.

In other examples, derived hyperlinks derived from implicit references can be used to also construct an index 132 or other repository of information relating to web resources. The index 132 can be used by a search engine to more quickly and efficiently find web resources in response to a search query.

Figure 2:
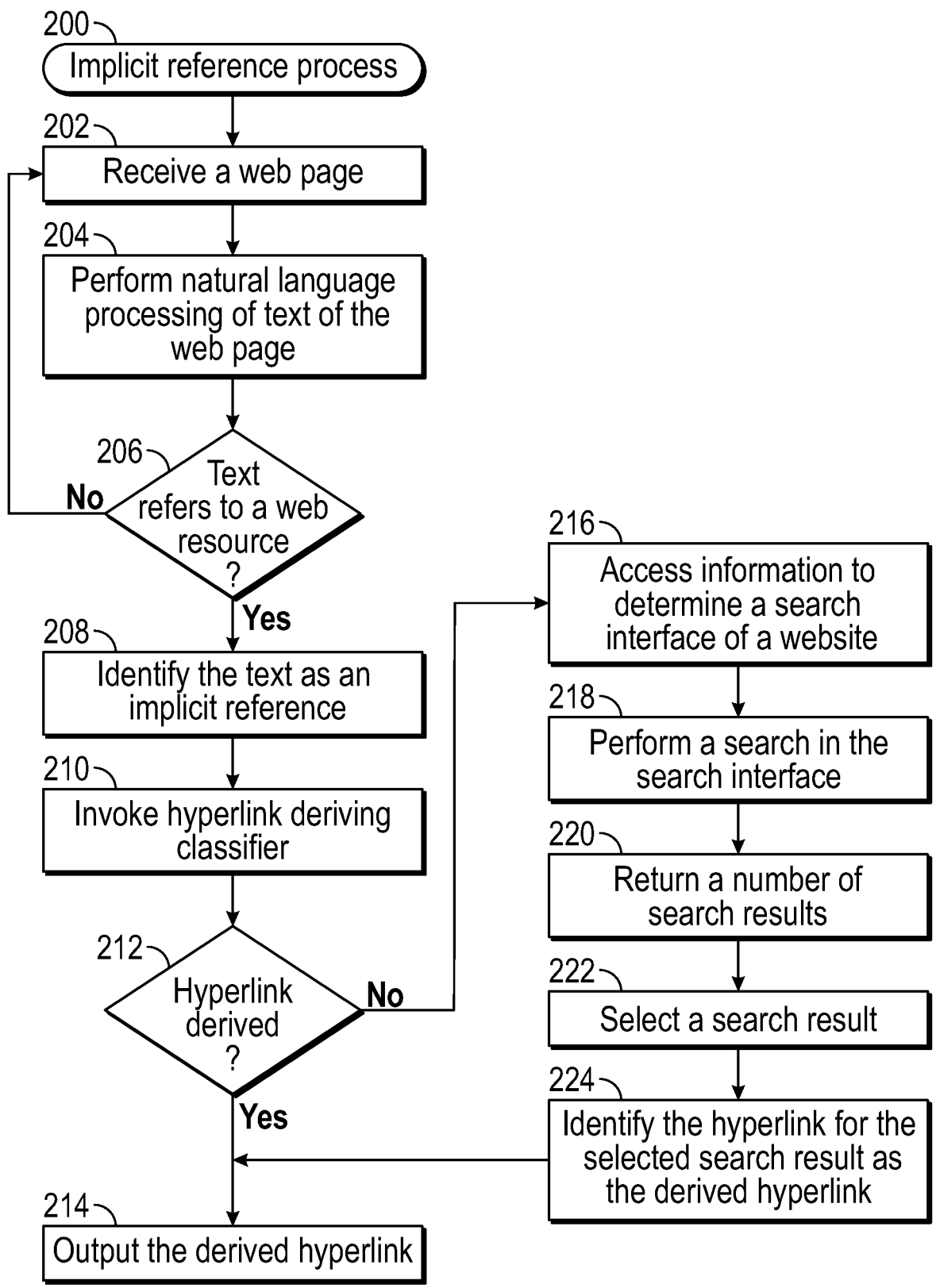
FIG. 2 is a flow diagram of a process according to some examples.

FIG. 2 is a flow diagram of an implicit reference process 200 performed by the implicit reference processing logic 108 according to some examples to derive a hyperlink from an implicit reference. The process 200 includes receiving (at 202) a web page (e.g., 104 in FIG. 1). The process 200 further includes performing (at 204) natural language processing of text of the web page to determine (at 206) whether the text refers to a web resource. If the text does not refer to a web resource, then processing can proceed to other text in the web page or to another web page. However, in response to determining that the text refers to a web resource, the process 200 identifies (at 208) the text as an implicit reference to the web resource.

The process 200 invokes (at 210) the hyperlink deriving classifier 124 in an attempt to derive a hyperlink to the web resource based on the implicit reference. The process 200 determines (at 212) whether the hyperlink was successfully derivable from the text of the implicit reference. If the hyperlink was successfully derived by the hyperlink deriving classifier 124, then the process 200 outputs (at 214) the derived hyperlink.

However, if the hyperlink deriving classifier 124 was not able to successfully derive the hyperlink based on the implicit reference, the process 200 performs secondary processing to derive the hyperlink corresponding to the implicit reference. The secondary processing includes accessing (at 216) information describing a structure of a website to determine a search interface useable to find the web resource. The information describing the structure of the website can include a Document Object Model (DOM) of the website. Parsing the DOM of the website allows for an understanding of the page layout presented by the website, such that a search interface of the website can be identified. The search interface can include a field (e.g., a text box) in which search terms can be input. The search interface can include an application programming interface (API) of the website used to perform a search.

The secondary processing performs (at 218) a search by inputting search term(s) into the search interface, and launching the search, such as by activating a control button on the search interface. The search term(s) that are input into the search can include a word or phrase from the implicit reference for which the corresponding hyperlink is to be derived. For example, the search interface can be the search interface of the nytimes.com website. The search term(s) entered into the search interface of the nytimes.com website can include the phrase "response to the royal wedding," in an attempt to find an article containing a story about the response to the royal wedding in the United Kingdom. The phrase "response to the royal wedding" can be part of the implicit reference.

In response to the search, the secondary processing returns (at 220) a number of search results (one search result or multiple search results). Assuming there are multiple search results, the search results can be analyzed to obtain relevant scores for the search results. In addition, further searches can be performed using variants of the search terms (e.g., synonyms of search terms) to find more search results. The secondary processing can select (at 222) a search result as being the most relevant, such as the search result with the highest relevance score. The relevance scores of the search results can be used to rank multiple search results, and a search result can be selected from the search results based on the ranking. The hyperlink for the web resource included in the selected search result is identified (at 224) as the derived hyperlink, which can be output (at 214).

Figure 3:
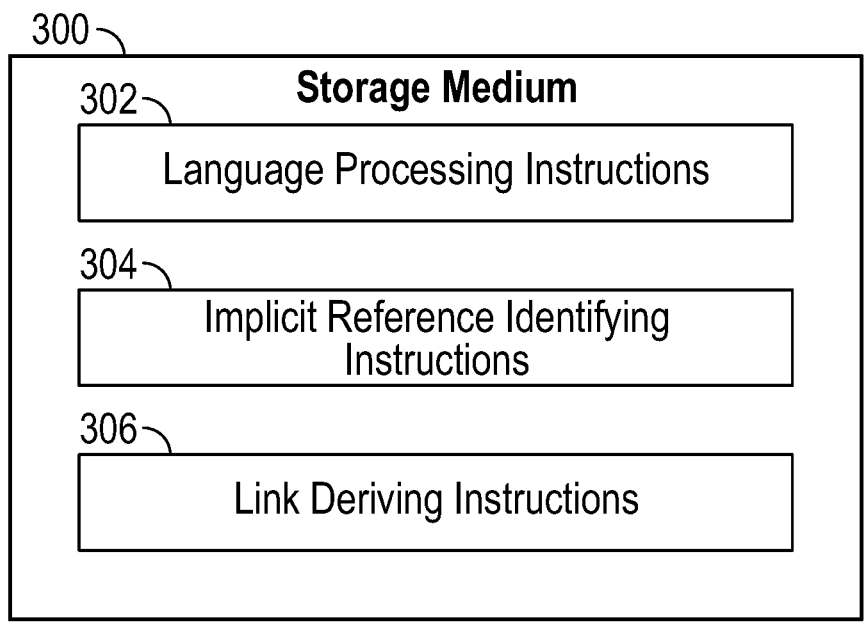
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a system to perform various tasks. The machine-readable instructions include language processing instructions 302 to perform language processing of text of an information page to determine whether the text refers to an online resource. The machine-readable instructions include implicit reference identifying instructions 304 to, in response to determining that the text refers to the online resource, identify the text as an implicit reference to the online resource.

The machine-readable instructions further include link deriving instructions 306 to derive a link to the online resource based on the implicit reference, where the derived link useable in accessing the online resource.

Deriving the link to the online resource based on the implicit reference can include determining an entity representing the online resource based on the text, such as by using the hyperlink deriving classifier 124 and syntactic model 130 of FIG. 1. The entity is included in the derived link.

In further examples, if the hyperlink deriving classifier 124 is unable to derive a link to the online resource based on the implicit reference, then a secondary processing as discussed above can be performed. The secondary processing analyzes information (e.g., a DOM) describing a structure of an information site (e.g., a website or any other server or storage, such as a Sharepoint server, a filesystem, etc., at which an online resource is available) to determine a search interface useable to find the online resource. The search interface is used to perform a search to obtain a search result referring to the online resource. A link of the search result can be used to obtain the derived link.

Figure 4:
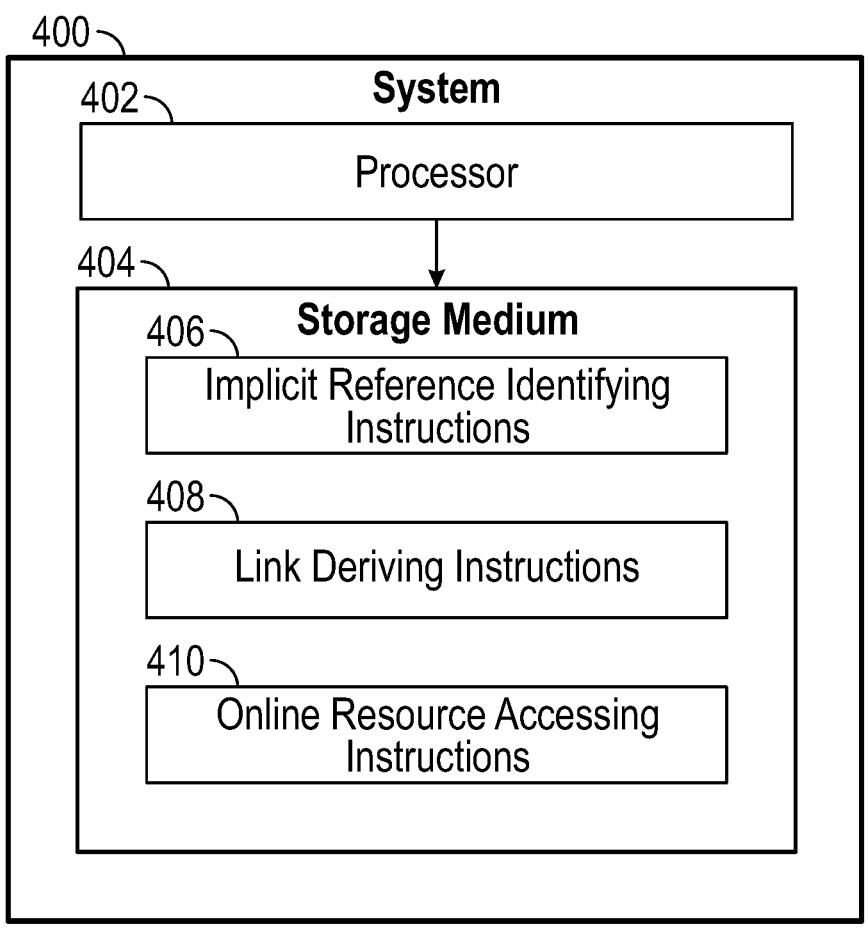
FIG. 4 is a block diagram of a system according to some examples.

FIG. 4 is a block diagram of a system 400 including a hardware processor 402 (or multiple hardware processors). A hardware processor can include a microprocessor, a core of a multi-core microprocessor, a microcontroller, a programmable integrated circuit, a programmable gate array, a digital signal processor, or another hardware processing circuit.

The system 400 further includes a storage medium 404 storing machine-readable instructions executable on the hardware processor 402 to perform various tasks. Machine-readable instructions executable on a hardware processor can refer to the instructions executable on a single hardware processor or the instructions executable on multiple hardware processors.

The machine-readable instructions include implicit reference identifying instructions 406 to identify text in an information page that refers to an online resource as an implicit reference in response to determining that the text refers to the online resource. The machine-readable instructions further include link deriving instructions 408 to derive, using a model (e.g., 130 in FIG. 1) that defines patterns of text that indicate presence of entities that are part of links to online resources, a link to the online resource based on the implicit reference.

The machine-readable instructions also include online resource accessing instructions 410 to access the online resource using the derived link.

Figure 5:
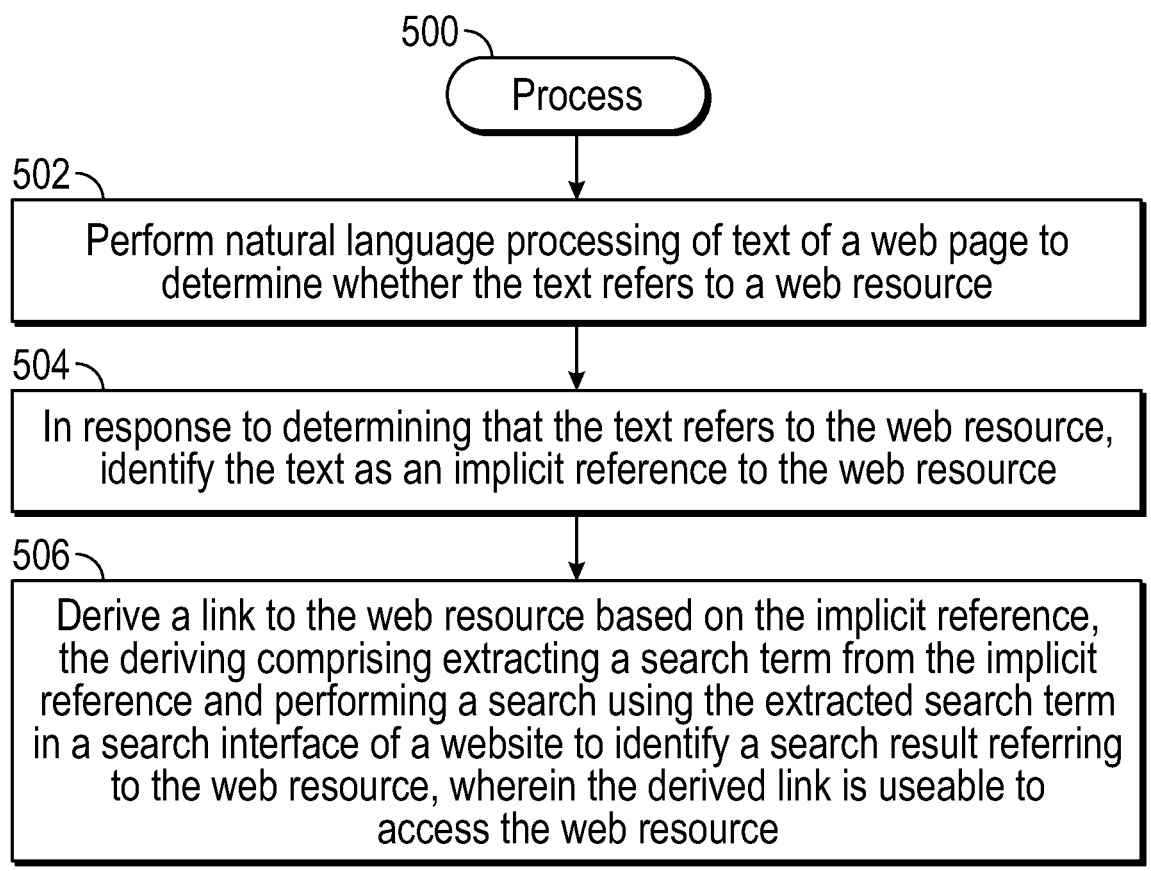
FIG. 5 is a flow diagram of a process according to alternative examples.

FIG. 5 is a flow diagram of a process 500 that includes performing (at 502) natural language processing of text of a web page to determine whether the text refers to a web resource, and in response to determining that the text refers to the web resource, identifying (at 504) the text as an implicit reference to the web resource.

The process 500 further includes deriving (at 506) a link to the web resource based on the implicit reference, the deriving comprising extracting a search term from the implicit reference and performing a search using the extracted search term in a search interface of a website to identify a search result referring to the web resource, wherein the derived link is useable to access the web resource.

The storage medium 300 (FIG. 3) or 404 (FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method performed by a system comprising a hardware processor, comprising:
    determining that text of a web page refers to a web resource, and in response to determining that the text refers to the web resource, identifying the text as an implicit reference to the web resource;
    invoking a classifier that classifies text in web pages;
    applying the classifier to the text of the web page in an attempt to derive a link to the web resource based on the implicit reference;
    determining whether the classifier was able to derive the link to the web resource,
    in response to determining that the classifier was not able to derive the link to the web resource:
        determining, based on analyzing information describing a structure of a website, a search interface comprising an input field;
        in response to identifying the text of the web page as the implicit reference to the web resource, performing a search based on inputting a search term into the input field of the search interface of the website;
        obtaining a search result referring to the web resource in response to the search; and
        using a hyperlink of the search result as the link to the web resource; and
    in response to determining that the classifier was able to derive the link to the web resource, using the link to the web resource derived by the classifier in accessing the web resource.

2. The method of claim 1, wherein the search term input into the input field of the search interface comprises the text of the web page.

3. The method of claim 2, wherein the performing of the search further comprises inputting a variant of the text of the web page into the search interface of the website to identify a further search result used in identifying the link to the web resource.

4. A non-transitory machine-readable storage medium comprising instructions that upon execution cause a system to:
    determine that text of an information page refers to an online resource by performing language processing of the text, and in response to determining that the text refers to the online resource, identify the text as an implicit reference to the online resource;
    invoke a classifier that classifies text in online pages;
    apply the classifier to the text of the information page in an attempt to derive a link to the online resource based on the implicit reference;
    determine whether the classifier was able to derive the link to the online resource,
    in response to determining that the classifier was not able to derive the link to the online resource:
        determine, based on analyzing information describing a structure of an information site, a search interface comprising an input field;
        in response to identifying the text of the information page as the implicit reference to the online resource, perform a search based on inputting a search term into the input field of the search interface;
        obtain a search result referring to the online resource in response to the search; and
        use a link of the search result as the link to the online resource;
    in response to determining that the classifier was able to derive the link to the online resource, use the link to the online resource derived by the classifier in accessing the online resource.

5. The non-transitory machine-readable storage medium of claim 4, wherein the language processing comprises a natural language processing.

6. The non-transitory machine-readable storage medium of claim 4, wherein the link to the online resource comprises a structured or semi-structured hyperlink.

7. The non-transitory machine-readable storage medium of claim 4, wherein the information site is a website, and wherein the analyzing of the information describing the structure of the information site comprises analyzing a Document Object Model (DOM) of the website.

8. The non-transitory machine-readable storage medium of claim 4, wherein the search term input into the input field of the search interface comprises the text of the information page.

9. The non-transitory machine-readable storage medium of claim 4, wherein the instructions upon execution cause the system to:
    derive the search term based on replacing a word or word phrase in the text of the information page with a synonym.

10. The non-transitory machine-readable storage medium of claim 4, wherein the search produces a plurality of search results, and wherein the instructions upon execution cause the system to:
   rank the plurality of search results;
   select a selected search result of the plurality of search results based on the ranking,
   wherein the link to the online resource is from the selected search result.

11. The non-transitory machine-readable storage medium of claim 10, wherein the inputting of the search term into the input field of the search interface comprises inputting a plurality of search terms into one or more input fields of the search interface.

12. A system comprising:
   a processor; and
   a non-transitory storage medium storing instructions executable on the processor to:
      determine that text of an information page refers to an online resource by performing language processing of the text;
      in response to determining that the text refers to the online resource, identify the text as an implicit reference;
      invoke a classifier in response to identifying the implicit reference;
      use, by the classifier, a model that defines patterns of text that indicate presence of entities that are part of links to online resources, in an attempt to derive a link to the online resource based on the implicit reference;
      determine whether the classifier was able to derive the link to the online resource;
      in response to determining that the classifier was not able to derive the link to the online resource:
         determine, based on analyzing information describing a structure of an information site, a search interface comprising an input field,
         perform a search based on inputting a search term into the input field of the search interface,
         obtain a search result referring to the online resource in response to the search; and
         use a link of the search result as the link to the online resource; and
      in response to determining that the classifier was able to derive the link to the online resource, use the link to the online resource derived by the classifier in accessing the online resource.

13. The system of claim 12, wherein the instructions are executable on the processor to:
   use natural language processing to detect the text of the information page that refers to the online resource.

14. The system of claim 12, wherein the link to the online resource comprises a structured or semi-structured hyperlink.

15. The system of claim 12, wherein the information site is a website, and wherein the search interface is a search interface of the website.

16. The system of claim 12, wherein the search term input into the input field of the search interface comprises the text of the information page.

17. The system of claim 12, wherein the instructions are executable on the processor to:
   perform a plurality of searches using a plurality of search terms in the search interface, the plurality of search terms being variants of the text of the information page;
   obtain a plurality of search results in response to the plurality of searches; and
   use links of the plurality of search results to obtain the link to the online resource.

18. The system of claim 17, wherein the instructions are executable on the processor to:
   rank the plurality of search results,
   wherein the using of the links of the plurality of search results to obtain the link to the online resource is based on the ranking.

* * * * *